(12) United States Patent
Park

(10) Patent No.: US 9,418,556 B2
(45) Date of Patent: Aug. 16, 2016

(54) APPARATUS AND METHOD FOR DISPLAYING A BLIND SPOT

(75) Inventor: Jae-Hong Park, Seoul (KR)

(73) Assignee: WISE AUTOMOTIVE CORPORATION, Seoul (KR)

(*) Notice: Subject to any disclaimer, the term of this patent is extended or adjusted under 35 U.S.C. 154(b) by 495 days.

(21) Appl. No.: 13/996,346

(22) PCT Filed: Dec. 29, 2011

(86) PCT No.: PCT/KR2011/010280
§ 371 (c)(1),
(2), (4) Date: Jul. 29, 2013

(87) PCT Pub. No.: WO2012/091476
PCT Pub. Date: Jul. 5, 2012

(65) Prior Publication Data
US 2013/0300872 A1    Nov. 14, 2013

(30) Foreign Application Priority Data

Dec. 30, 2010 (KR) .......................... 10-2010-0138493
Dec. 9, 2011 (KR) .......................... 10-2011-0132051

(51) Int. Cl.
*G08G 1/16* (2006.01)
*B60R 1/00* (2006.01)

(52) U.S. Cl.
CPC *G08G 1/167* (2013.01); *B60R 1/00* (2013.01); *B60R 2300/70* (2013.01); *B60R 2300/802* (2013.01)

(58) Field of Classification Search
CPC .................... G08G 1/167; G06T 2207/30264; B60R 25/1012; B60R 2300/806; B60R 1/007; B60R 2300/202; B60R 2300/802

USPC ........................................... 348/148; 340/435
See application file for complete search history.

(56) References Cited

U.S. PATENT DOCUMENTS

| | | | | |
|---|---|---|---|---|
| 6,483,429 B1* | 11/2002 | Yasui | ..................... | B60Q 9/005 340/435 |
| 2006/0192660 A1* | 8/2006 | Watanabe | ................. | B60R 1/00 340/435 |
| 2007/0088478 A1* | 4/2007 | Mori | ................... | B60W 40/105 701/41 |
| 2007/0097209 A1* | 5/2007 | Kubota | ............. | B62D 15/0275 348/118 |
| 2009/0122140 A1* | 5/2009 | Imamura | ................ | B60Q 9/005 348/148 |
| 2009/0297036 A1* | 12/2009 | Badino | ............. | G06K 9/00818 382/209 |
| 2010/0097457 A1* | 4/2010 | Zhang | ................ | G06K 9/00805 348/119 |

FOREIGN PATENT DOCUMENTS

| | | |
|---|---|---|
| JP | 2006-074105 A | 3/2006 |
| JP | 2010-109684 A | 5/2010 |
| KR | 10-0833603 B1 | 5/2008 |
| KR | 10-2009-0109437 A | 10/2009 |

* cited by examiner

*Primary Examiner* — Sath V Perungavoor
*Assistant Examiner* — Nathnael Aynalem
(74) *Attorney, Agent, or Firm* — NSIP Law

(57) ABSTRACT

An apparatus and method for displaying a blind spot, which involve displaying at least one image of the surroundings of a vehicle, in which the image is provided by an imaging unit including a camera, a GPS navigation system, and/or a street-view receiver, so as to provide a driver with information on the blind spots of a front portion, a rear portion, and a side portion of a vehicle that are hidden by the vehicle and thus not easily seen within the field of view of the driver during travel of the vehicle.

16 Claims, 10 Drawing Sheets

FIG 6
(a) 
(b) 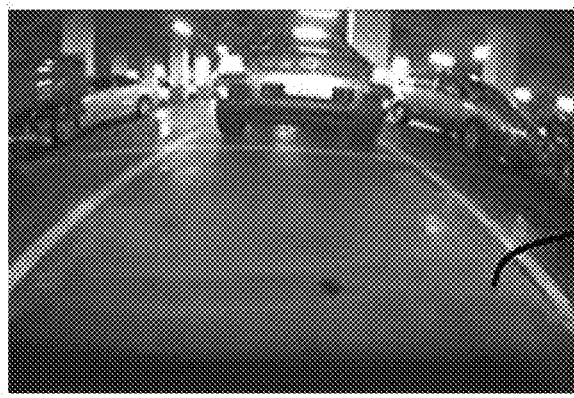
(c) 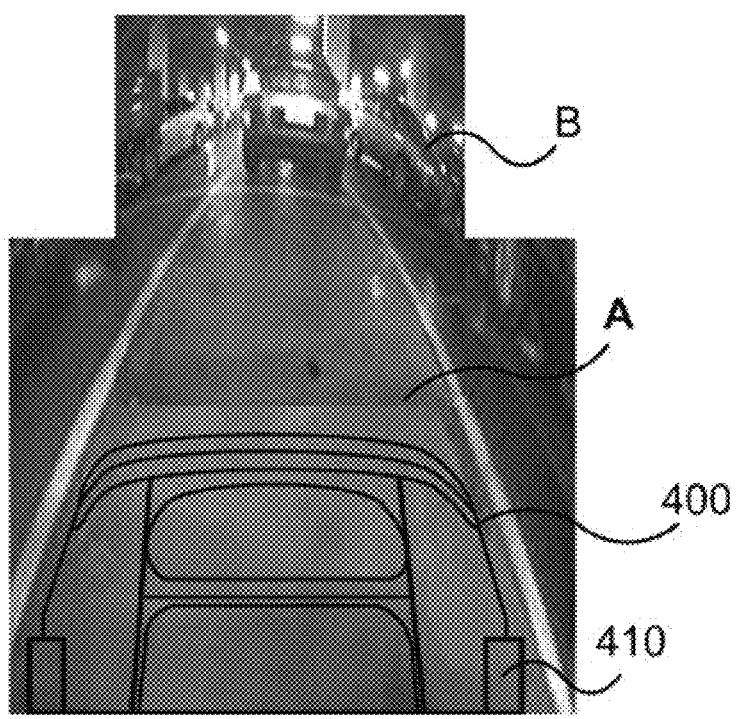

FIG 7
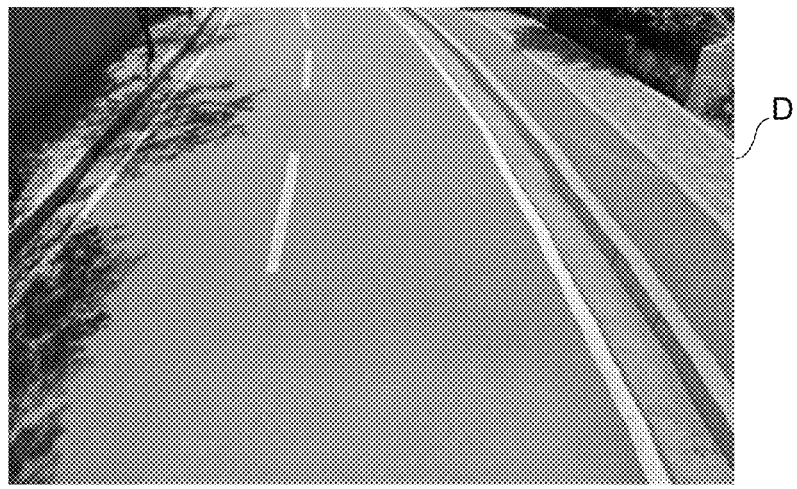
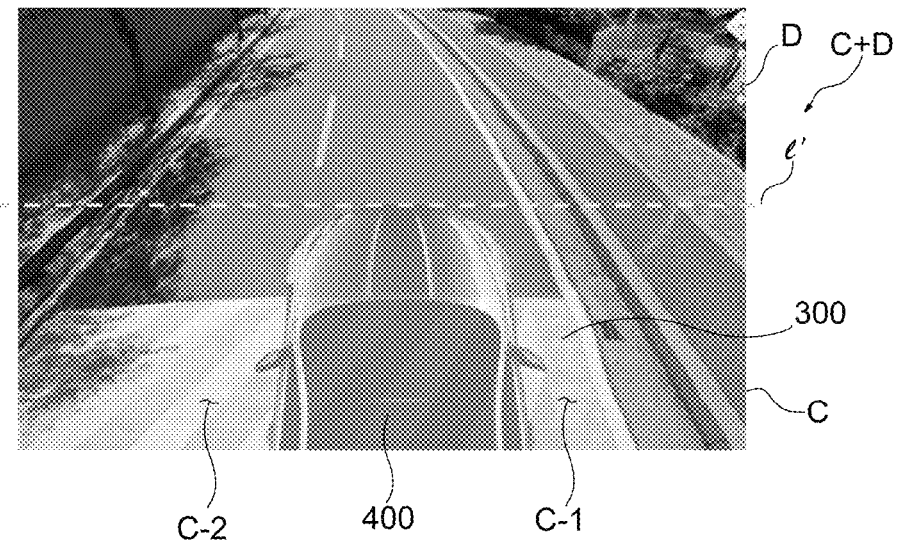

APPARATUS AND METHOD FOR DISPLAYING A BLIND SPOT

CROSS-REFERENCE TO RELATED APPLICATIONS

This Application is a U.S. National Phase Application under 35. U.S.C. §371 of PCT Application No. PCT/KR2011/010280 filed Dec. 29, 2011, which claims the benefit of Korean Patent Application No. 10-2010-0138493, filed on Dec. 30, 2010 and Korean Patent Application No. 10-2011-0132051, filed on Dec. 9, 2011 in the Korean Intellectual Property Office, the entire disclosures of which are incorporated herein by reference for all purposes.

TECHNICAL FIELD

The present invention relates to an apparatus and method for displaying a blind spot in the surroundings of a vehicle and, more particularly, to an apparatus and method for providing a driver with information on blind spots in the front, rear, and sides of a vehicle that are hidden by a vehicle body and thus rarely seen within a field of view of the driver when the driver drives the vehicle by displaying one or more images of the surroundings of the vehicle provided by a camera, a GPS navigation system, and/or a street-view receiver.

BACKGROUND ART

In general, a vehicle runs on a road by using a motor, such as an engine installed in a vehicle body, as a power source. A vehicle is an apparatus for carrying persons or goods or performing various tasks. The driver of a vehicle safely drives the vehicle while watching a driving direction.

In a common vehicle 10, however, as shown in FIG. 1, a blind spot 20 is formed because a front portion near the vehicle 10 does not fall within a field of view of a driver due to the front portion in which an engine necessary to drive the vehicle 10 is installed. Furthermore, a blind spot 30 that partially limits a field of view of the rear is formed due to a trunk formed in the rear portion of the vehicle 10, and blind spots 40 that partially limit fields of view of the sides are formed due to the doors of the vehicle.

The blind spots 20, 30, and 40 refer to areas located at angles where things are not seed by an eye. If fields of view of the front and rear of a driver are limited by part of the vehicle body of the vehicle, there is no problem due to an obstacle in driving when the driver drives the vehicle on a road having extensive front views. However, the driver feels difficult to secure a field of view and to park the vehicle if obstacles are located in the blind spots because several obstacles are present in the surroundings of the vehicle 10.

Furthermore, a driver who is not accustomed to parking can hit an obstacle hidden in the front or rear of a vehicle when parking the vehicle. Even a driver who is accustomed to parking can park his vehicle while raising his head and watching the front and rear portions of a vehicle in order to avoid hidden obstacles, but there is a problem in that parking is very difficult because only a partial field of view is secured.

Furthermore, although a driver already recognizes that an obstacle is present in the front or rear of a vehicle, there is a problem in that the driver can hit the obstacle because he does not temporarily remember the obstacle when the driver focuses on driving or parking.

DISCLOSURE

Technical Problem

An object of the present invention is to provide an apparatus and method for providing a driver with information on blind spots in the front, rear, and sides of a vehicle that are hidden by a vehicle body and thus rarely seen within a field of view of the driver when the driver drives the vehicle by displaying one or more images of the surroundings of the vehicle provided by a camera, a GPS navigation system, and/or a street-view receiver.

Technical Solution

To achieve the above object, the present invention provides an apparatus for displaying a blind spot, including an imaging unit or detecting surrounding images of a vehicle; a control unit for outputting at least one image captured by the imaging unit at a specific point of time or before the specific point of time as an image for display and displaying a vehicle icon indicative of a current position of the vehicle on the outputted image for display in a contour form or semi-transparently so that a blind spot covered by a vehicle body of the vehicle is displayed; and a screen display unit for displaying the image for display and the vehicle icon outputted from the control unit.

Furthermore, the outputted image for display in accordance with the present invention is any one of an original image of the captured image and an image obtained by converting a point of time of the original image.

Furthermore, the outputted image for display in accordance with the present invention is any one of an original image of the captured image, an image obtained by composing several images whose points of time have been converted, and a combination of some of several images.

Furthermore, the blind spot covered by the vehicle body in accordance with the present invention includes a lower part of the vehicle.

Furthermore, the imaging unit in accordance with the present invention is any one of a camera installed in the vehicle and configured to capture the surrounding images of the vehicle and provide the captured images, a GPS navigation system configured to detect information on a position of the vehicle and provide a surrounding image corresponding to the detected information, and an external information reception unit configured to receive the surrounding images of the vehicle from cameras installed in surrounding roads or buildings of the vehicle and provide the received surrounding images.

Furthermore, the control unit in accordance with the present invention calculates displacement information on a movement of the vehicle from a specific position using information on a position movement of the vehicle supplied outside the vehicle or driving control information detected from the vehicle and detects information on the current position of the vehicle based on the calculated displacement information.

Furthermore, the control unit in accordance with the present invention displays a position of the vehicle icon displayed on the image for display by incorporating information on a real-time position according to a movement of the vehicle into the position of the vehicle icon.

Furthermore, the change of the position of the vehicle icon displayed on the image for display in accordance with the present invention includes changing only the position of the vehicle icon in a state in which the image for display is fixed, moving only the image for display in a state in which the position of the vehicle icon is fixed, or changing both the image for display and the position of the vehicle icon.

Furthermore, the generated image for display in accordance with the present invention is obtained by merging image areas moved by a predetermined number of unit pixels using information on a position of the vehicle supplied from the vehicle or driving control information detected from the vehicle.

Furthermore, the generated image for display in accordance with the present invention is obtained by comparing only images with each other and merging an image area including pixels having similarity and an image area having low similarity near the image area including pixels as a result of the comparison.

Furthermore, information on the generated image in accordance with the present invention is obtained by extracting a reduced image search area according to information on a speed and steering angle of the vehicle based on information on a driving of the vehicle comprising the speed and movement direction of the vehicle supplied from the vehicle and merging an image area including pixels having similarity and an image area having low similarity near the image area including pixels using the extracted reduced image search area.

Furthermore, the present invention provides a method for displaying a blind spot, including the steps of a) a control unit outputting at least one image, captured by an imaging unit at a specific point of time or prior to the specific point of time, as an image for display; b) the control unit calculating information on a displacement of a vehicle moved from a specific position based on information on a movement of a position of the vehicle supplied outside the vehicle or driving control information supplied from the vehicle and detecting a current position of the vehicle based on the calculated information on the movement displacement; and c) the control unit displaying the image for display and a vehicle icon indicative of the current position of the vehicle by displaying the vehicle icon based on the current position and the displacement information, detected at the step b), on the image for display outputted at the step a) in a contour form or semi-transparently so that a blind spot near the vehicle and a blind spot covered by a vehicle body are displayed.

Furthermore, the image for display at the step a) in accordance with the present invention is any one of an original image of the captured image and an image obtained by converting a point of time of the original image.

Furthermore, the image for display at the step a) in accordance with the present invention is any one of an original image of the captured image, an image obtained by composing several images whose points of time have been converted, and a combination of some of several images Furthermore, the image for display at the step a) in accordance with the present invention is an image captured by any one of a camera installed in the vehicle and configured to capture the surrounding images of the vehicle and provide the captured images, a GPS navigation system configured to detect information on a position of the vehicle and provide a surrounding image corresponding to the detected information, and an external information reception unit configured to receive the surrounding images of the vehicle from cameras installed in surrounding roads or buildings of the vehicle and provide the received surrounding images.

Furthermore, the vehicle icon in accordance with the present invention is displayed so that a position of the vehicle icon displayed on the image for display is changed by incorporating information on a real-time position according to a movement of the vehicle into the position of the vehicle icon.

Furthermore, the change of the position of the vehicle icon displayed on the image for display in accordance with the present invention includes changing only the position of the vehicle icon in a state in which the image for display is fixed, moving only the image for display in a state in which the position of the vehicle icon is fixed, or changing both the image for display and the position of the vehicle icon.

Advantageous Effects

The present invention is advantageous in that information on blind spots in the front, rear, and sides of a vehicle that are hidden by a vehicle body and thus rarely seen within a field of view of a driver when the driver drives the vehicle can be provided to the driver by displaying one or more images of the surroundings of the vehicle provided by the imaging unit.

Furthermore, the present invention is advantageous in that a safe driving environment and a safe parking environment can be provided to a driver because blind spots rarely seen within a field of view of the driver can be checked.

DESCRIPTION OF DRAWINGS

FIG. 6 is an exemplary diagram in which an embodiment of a vehicle icon is displayed on an image captured by the apparatus for displaying a blind spot in accordance with the present invention.

FIG. 7 is an exemplary diagram in which another embodiment of a vehicle icon is displayed on an image captured by the apparatus for displaying a blind spot in accordance with the present invention.

DESCRIPTION OF REFERENCE NUMERALS OF PRINCIPAL ELEMENTS IN THE DRAWINGS

Figure 1:
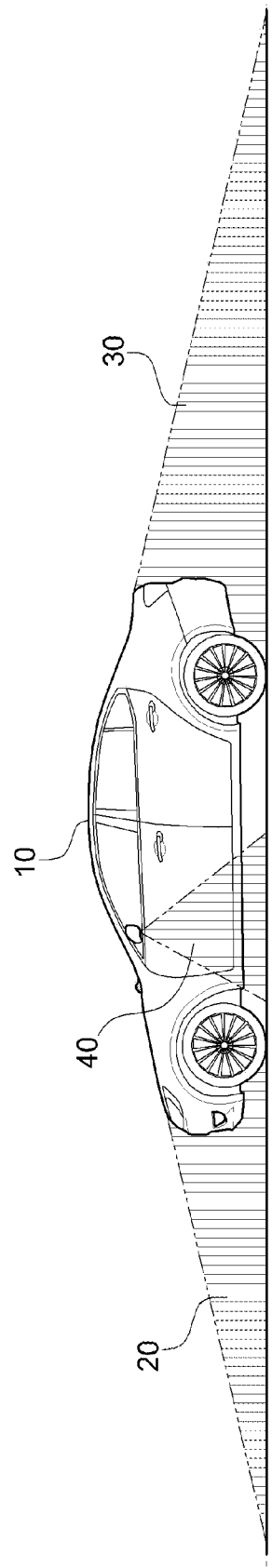
FIG. 1 is an exemplary diagram showing blind spots in the front and rear of a common vehicle.

100: apparatus for displaying a blind spot
110: first camera
110': first camera after a lapse of t seconds
120: second camera
120': second camera after a lapse of t seconds
130: control unit       140: screen display unit -continued 150: $n^{th}$ camera
200': vehicle after a lapse of t seconds
300: speed bump
410: wheel
600: apparatus for displaying a blind spot
610: GPS navigation system
620: external information reception unit
630: control unit
640: screen display unit
200: vehicle
400: vehicle icon
500: direction guide information

MODE FOR INVENTION

Preferred embodiments of an apparatus and method for displaying a blind spot in accordance with the present invention are described in detail with reference to the accompanying drawings.

First Embodiment

Figure 2:
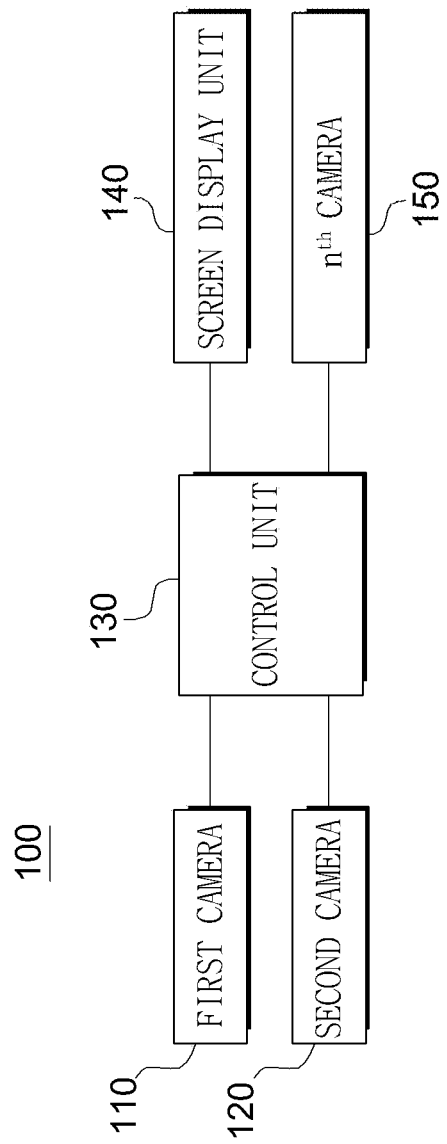
FIG. 2 is a block diagram showing an embodiment of an apparatus for displaying a blind spot in accordance with the present invention.
Figure 3:
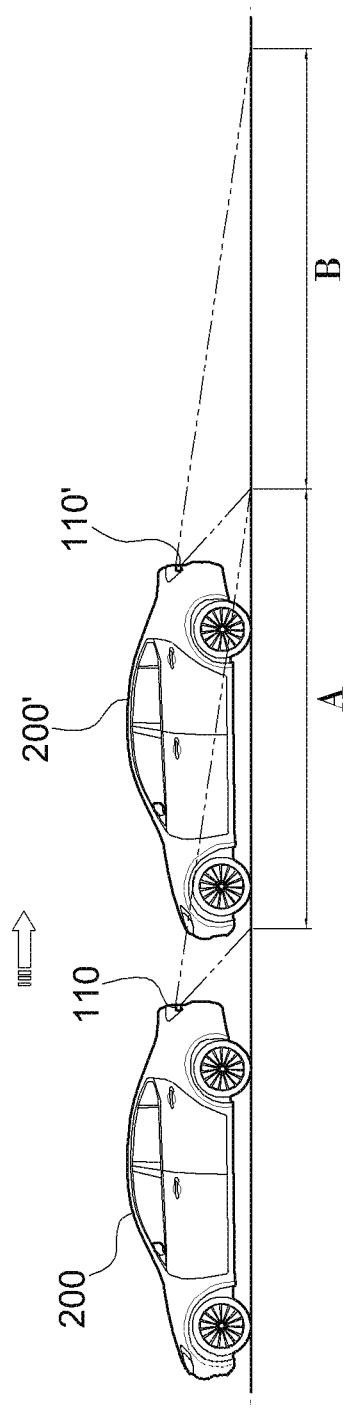
FIG. 3 is an exemplary diagram showing an operating process of the apparatus for displaying a blind spot in accordance with the present invention.
Figure 4:
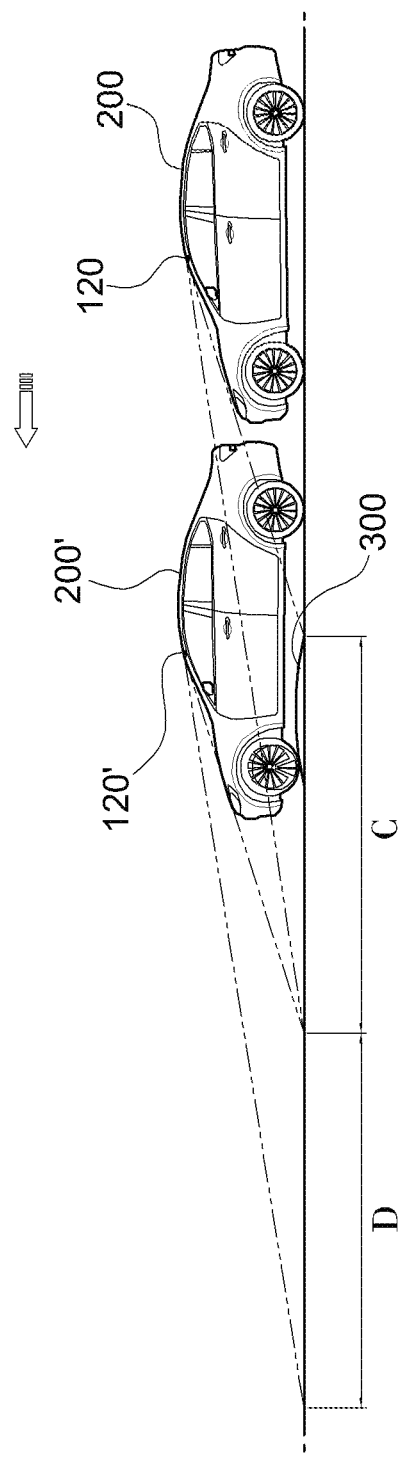
FIG. 4 is an exemplary diagram showing another operating process of the apparatus for displaying a blind spot in accordance with the present invention.
Figure 5:
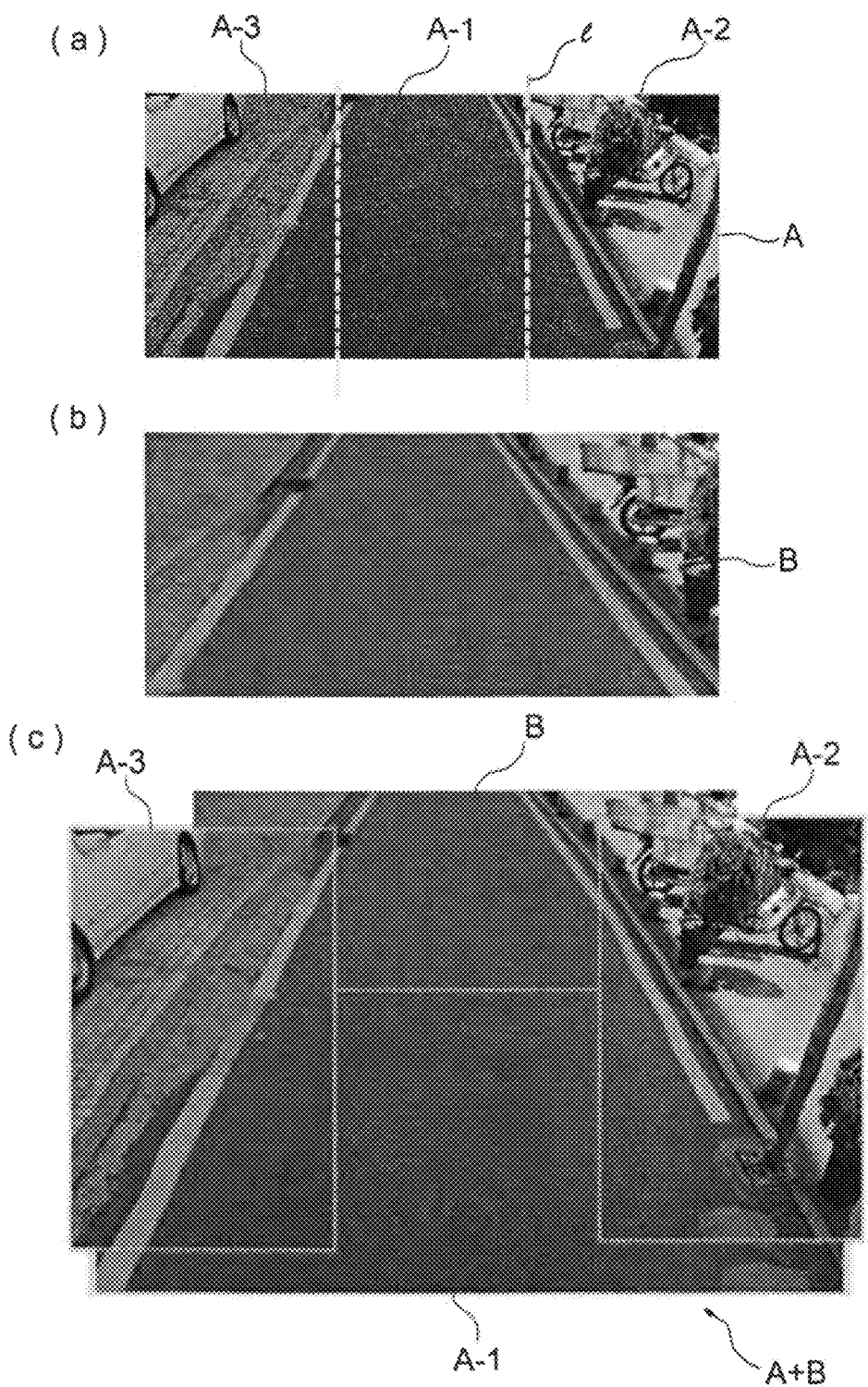
FIG. 5 is an exemplary diagram in which a rear past image and a current image captured by the apparatus for displaying a blind spot in accordance with the present invention are merged.

FIG. 2 is a block diagram showing an embodiment of an apparatus for displaying a blind spot in accordance with the present invention, FIG. 3 is an exemplary diagram showing an operating process of the apparatus for displaying a blind spot in accordance with the present invention, FIG. 4 is an exemplary diagram showing another operating process of the apparatus for displaying a blind spot in accordance with the present invention, and FIG. 5 is an exemplary diagram in which a rear past image and a current image captured by the apparatus for displaying a blind spot in accordance with the present invention are merged.

As shown in FIG. 2 to FIG. 5, the apparatus for displaying a blind spot 100 in accordance with the present invention includes a first camera 110, a second camera 120, and an $n^{th}$ camera 150 as imaging means for providing images of the surroundings of a vehicle, a control unit 130, and a screen display unit 140.

The first camera 110 is an element installed in the vehicle 200 and configured to output a captured image of the rear of the vehicle while running. The first camera 110 is installed in a taillight installed in the room of the vehicle, a taillight, or a trunk door, etc.

The second camera 120 is an element installed in the vehicle 200 and configured to output a captured image of the front of the vehicle while running. The second camera 120 is installed in a room mirror installed in the room of the vehicle, a head lamp, a radiator grill, etc.

The $n^{th}$ camera 150 is an element installed in the vehicle 200 and configured to output captured images of the sides of the vehicle while running. The $n^{th}$ camera 150 is installed in the side-view mirrors of the vehicle, etc.

Any one of a CMOS type image sensor, a CCD type image sensor, and the third type image sensor can be used as the first, the second, and the $n^{th}$ cameras 110, 120, and 150.

Furthermore, in the present embodiment, in order to capture a driving direction image of the front or rear of the vehicle, a construction including one camera is illustrated, but a construction including a plurality of cameras for photographing the same driving direction is also possible.

The control unit 130 displays one or more images captured by the first camera 110, the second camera 120, or the $n^{th}$ camera 150 at a specific point of time (hereinafter referred to as a 'current point of time') without change or displays images generated by performing any one of mergence, conversion, and combination using a previously stored image processing program through the screen display unit 140.

When the vehicle 200 runs backward from a specific departure position as shown in FIG. 3, the control unit 130 detects at least one rear image A+B captured by the first camera 110 for photographing a specific area in the rear of the vehicle at a specific point of time and stores the detected rear images in storage means, such as a memory (not shown).

Here, the specific point of time may be a current point of time or may be any one point of time of a specific time interval between the past point of time and a current point of time.

Furthermore, the at least one image A+B captured at the specific point of time may be one long image or may be one image A+B obtained by merging a first image A, captured at a specific past point of time, and a second image B captured by the first camera 110' of the vehicle 200' that has run after a lapse of a specific time (e.g., t seconds) at specific speed at the current point of time.

Furthermore, the control unit 130 detects information on a movement distance, movement speed, driving direction, and steering angle of the vehicle based on information on a movement distance calculated by comparing current images, captured by the ECU, TCU, speed sensor, steering angle sensor, wheel sensor, and camera of the vehicle, with images captured right before and detects information on the movement displacement of the vehicle based on driving control information including the detected information on the movement distance, movement speed, driving direction, and steering angle.

Furthermore, the control unit 130 calculates a movement position of the vehicle per hour from a specific position based on the detected information on the movement displacement of the vehicle, detects information on a current position of the vehicle based on the calculated movement position, and displays a vehicle icon 400 in a contour or semi-transparent form having a vehicle shape in order to indicate the current position of the vehicle 200' at a specific position of the rear image A+B corresponding to the detected information on the current position of the vehicle.

That is, after detecting the rear image A+B, the control unit 130 displays the vehicle icon 400 in a contour or semi-transparent form having a vehicle shape on the detected rear image A+B instead of the real vehicle 200, calculates a movement distance of the vehicle 200' after a specific time from a specific position, for example, 0.5 second based on speed information detected by the speed sensor or TCU, etc. of the vehicle, and displays the contour or semi-transparent form having a vehicle shape at a position moved by a predetermined number of unit pixels or a specific distance, for example, in the area A on the rear image A+B based on the calculated movement distance of the vehicle. The specific time is illustrated as being 0.5 second, for convenience of description, but the present invention is not limited thereto.

Furthermore, when the vehicle runs forward as shown in FIG. 4, the control unit 130 detects at least one front image C+D captured by the second camera 120 at a specific point of time and stores the detected front image C+D in storage means, such as the memory (not shown).

The at least one front image C+D captured at the specific point of time may be one long image or may be an image obtained by merging a first front image C captured at a specific past point of time and a second front image D captured by the second camera 120' of the vehicle 200' that has moved at specific speed at a current point of time after a lapse of a specific time (e.g., t seconds).

Furthermore, the control unit 130 detects information on a movement displacement of the vehicle, including information on a speed, driving direction, and steering angle of the vehicle, from the vehicle, calculates a position of the vehicle that has moved per hour from a specific position based on the detected information on the movement displacement of the vehicle, detects a current position of the vehicle based on the calculated position, and displays the vehicle icon 400 in a contour or semi-transparent form having a vehicle shape in order to indicate the current position of the vehicle 200' at a specific position of the front image C+D.

That is, after detecting the front image C+D, the control unit 130 displays the contour or semi-transparent vehicle icon 400 on the detected front image C+D instead of the real vehicle 200', calculates a movement distance of the vehicle 200' after a specific time based on information on the speed of the vehicle, and displays the contour or semi-transparent vehicle icon at a position moved by a predetermined number of unit pixels, for example, in the area C on the front image C+D based on the calculated position of the vehicle.

Meanwhile, in the process of merging a past image and a current image, as shown in FIGS. 5a and 5b, for example, when information on the first rear image A and the second rear image B is detected, the information on the first rear image A, that is, information on a past image, is merged with information on the second rear image B, that is, information on a current image, thereby generating the image A+B for display, such as that shown in FIG. 5c.

Here, the information on the first rear image A, that is, an image of a place through which the vehicle passed in the past, is separated into specific mergence areas A-1, A-2, and A-3 on indication lines 1, characteristic points for the separated mergence areas A-1, A-2, and A-3 and information on the second rear image B, that is, a current image, are extracted by recognizing an object, pieces of information on the mergence areas A-1, A-2 and A-3 of the first rear image necessary for mergence are detected based on the extracted characteristic points, and the image A+B for display is generated by controlling the size of the images in the respective mergence areas A-1, A-2 and A-3 using a merger merge program or a stitching program.

That is, the image for display may be one image captured at a specific point of time t+1, may be an image obtained by merging an image captured at the specific point of time t+1 and an image captured at a previous point of time t, or may be an image obtained by merging the image captured at the specific point of time t+1, the image captured at the previous point of time t, and an image captured at a point of time t−1 prior to the previous point of time t in order to display a blind spot not seen by a camera using the past image.

In the mergence of images in the present embodiment, two images are compared with each other and image areas including pixels having similarity as a result of the comparison are merged. In contrast, image areas moved by a predetermined number of unit pixels based on information on the speed and the steering angle of a vehicle may be merged based on information on the driving of the vehicle including the speed and movement direction of the vehicle.

That is, if speed of a vehicle is 10 Km and a steering angle of the vehicle is 10 degrees, image areas whose pixels are moved by a predetermined number of unit pixels (e.g., 20 pixels) in any one of up and down directions in the driving direction and then moved by a predetermined number of unit pixels (e.g., 10 pixels) left or right in the steering direction may be merged.

Furthermore, in order to merge images more precisely, the images can be merged more precisely by reducing the search area of an image according to information on the speed and steering angle of a vehicle and extracting image areas including pixels having similarity from the image having the reduced search area based on information on the driving of the vehicle including information on the speed and movement direction of the vehicle supplied from the vehicle.

Meanwhile, if the pixels of areas having similarity are extracted from a past image and the remaining pixel areas located in the surroundings of the pixels areas having similarity on the past image, that is, pixels areas having low similarity are extracted and merged, an image for display including a blind spot not seen in a current image can be generated using the past image. FIG. 6 shows that blind spots covered by the vehicle body of a vehicle are displayed along with a vehicle icon on an image detected by the apparatus for displaying a blind spot. FIG. 6a shows a first rear image A captured by the camera prior to a specific point of time (past) when a vehicle runs backward, FIG. 6b shows a second rear image B captured by the camera at a specific point of time, (current) and FIG. 6c shows an image A+B for display obtained by merging the first rear image A and the second rear image B.

As shown in FIG. 6c, when the second rear image B captured at the specific point of time (current) and the first rear image A captured at the point of time prior to the specific point of time (past) are merged, one long image A+B for display is generated, so that a blind spot not seen in the second rear image B (i.e., a portion covered by the vehicle body) can be seen.

The image A+B for display may be generated by merging the current image and the past image, but may be displayed using one long image.

Meanwhile, the control unit 130 can display the vehicle icon 400 using a contour in such a way as to overlap with the second rear image A so that a driver can check a current position of the vehicle on the generated image A+B for display and check a precise position of the vehicle that runs backward.

Furthermore, the control unit 130 can also display the position of a wheel 410 along with the vehicle icon 400 so that a driver can check whether the wheel 410 is deviated from a parking guide line or the vehicle runs backward in a precise direction, for example.

Furthermore, FIG. 7 shows that a blind spot covered by the vehicle body of a vehicle is displayed along with a vehicle icon on an image captured by the apparatus for displaying a blind spot. When the vehicle runs forward, FIG. 7a shows a second front image D of the current surroundings of the vehicle that runs forward captured by the second camera 120, and FIG. 7b shows an image C+D for display obtained by merging a first front image C captured in the past prior to a specific time and the second front image D or an image for display generated by capturing one front image C+D including a speed bump 300 in a specific point of time using the second camera 120.

When the vehicle continues to run and then enter an area C on the front image C+D merged with a current position of the vehicle after t seconds, the driver can recognize that the vehicle passes through the speed bump 300 seen prior to the t seconds, but the real speed bump 300 is covered by the vehicle body and located in a blind spot that is rarely seen within a field of view of the driver.

In order for the driver to recognize information on the speed bump 300 located in the blind spot, the control unit 130 calculates information on a movement displacement of the vehicle based on information on the movement distance, speed, and steering angle of the vehicle using a recognize distance and position calculation program, detects information on the movement distance of the vehicle from a specific point of time and on the position of the vehicle based on the calculated information, and displays a virtual vehicle icon 400, indicating a current position of the vehicle, in a corresponding area on the front image C+D (e.g., the area C) based on the detected information on the distance and position in a contour or semi-transparent form having a vehicle shape. Accordingly, the driver can recognize a blind spot under the vehicle that is covered by the vehicle body.

Furthermore, the control unit 130 displays a virtual vehicle icon 400 in a place where the vehicle is now placed in a contour or semi-transparent form having a vehicle shape. Accordingly, the driver can recognize that the vehicle is now passing through a section in which the speed bump 300 is installed and can check a blind spot area C-1 and a blind spot area C-2 on the right and left sides of the vehicle icon 400.

Furthermore, the control unit 130 displays information on the virtual vehicle icon 400 on the front image C+D in a contour or semi-transparent form having a vehicle shape so that the driver can recognize information on an obstacle and direction guide located in a road in the surroundings of the vehicle.

Figure 8:
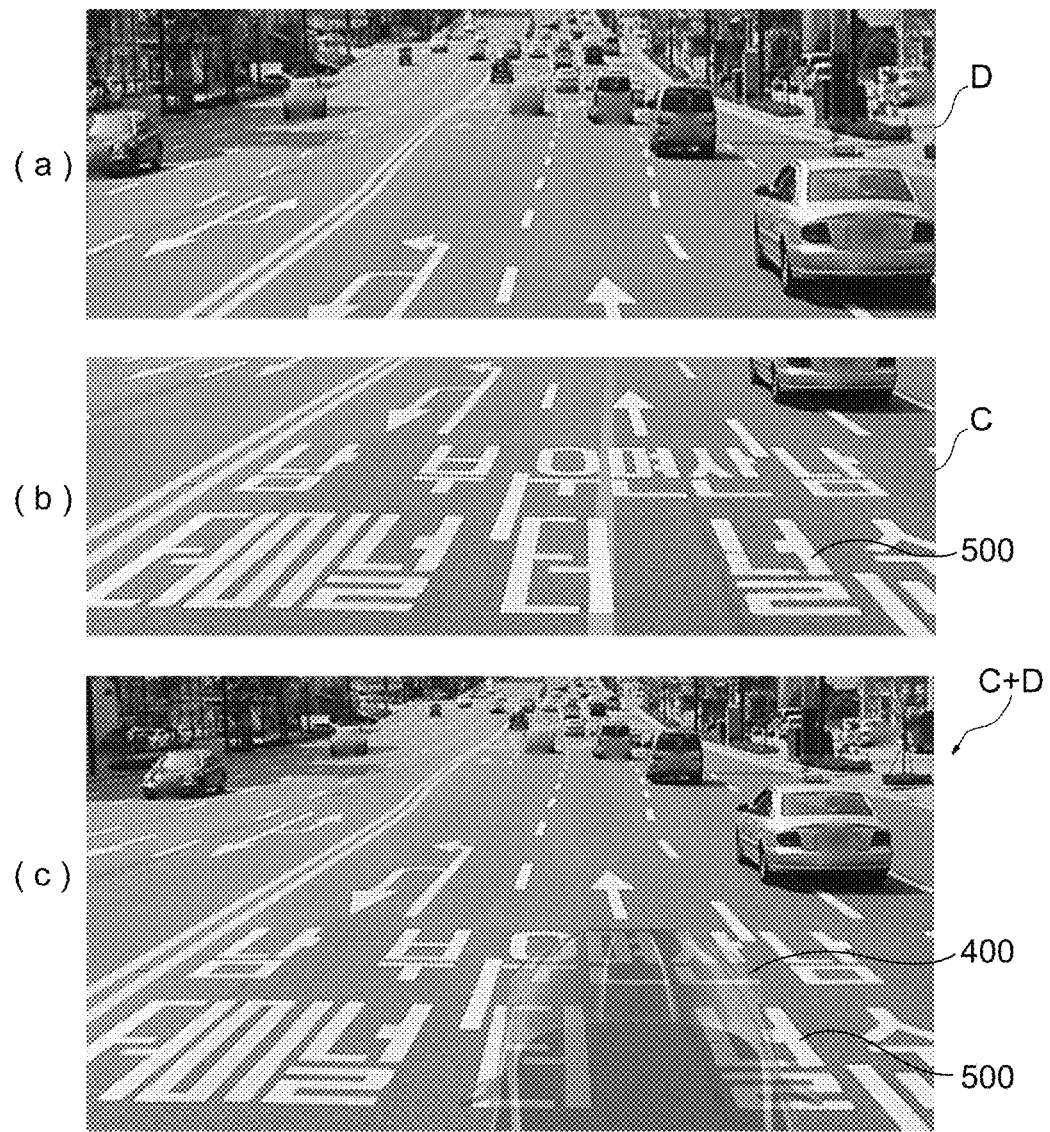
FIG. 8 is an exemplary diagram in which a vehicle icon is displayed on a road image captured by the apparatus for displaying a blind spot in accordance with the present invention.

Furthermore, an example in which obstacles covered by the vehicle body of a vehicle and located under the vehicle and in a road in the surroundings of the vehicle and direction guide information are displayed for a driver is described in more detail below with reference to FIG. 8.

FIG. 8a shows information on a second front image D, that is, a current image, FIG. 8b shows information on a first front image C, that is, a past image prior to a specific time (e.g., 0.5 second), and FIG. 8c shows information on a front matching image C+D in which FIGS. 8a and 8b are matched.

If a driver has not recognized direction guide information 500 on a road while driving, the control unit 130 displays a virtual vehicle icon 400, displayed on the front image C+D only in a contour or semi-transparent form having a vehicle shape so that the driver can recognize the direction guide information 500.

Furthermore, the control unit 130 can check whether or not a fixed object or a moving object is included in a current image and a past image prior to a specific point of time and display information on the distance up to the object based on a result of the check.

That is, if an image is captured by one camera, the control unit 130 detects information on the pixels of objects having similar characteristics (e.g., the brightness of pixels and whether or not an edge exists) in a current image and a past image by processing an image captured at a current point of time and an image at a past point of time prior to a specific time and detects information (pixel information) on a specific object including the displacement.

The control unit 130 can recognize an object by detecting similarity through a movement displacement and an angular displacement of pixels defined as vector by comparing two interested images through image processing, can recognize an object by using edges, such as the boundary line or contour of an object or lines or curves approximate to the contour of an object, can recognize an object by using edge points present within an image, unchanged points, or characteristic points that are not changed in relation to rotational conversion or a change in the size, or can recognize an object by extracting the characteristic points of the object included in an image.

Furthermore, the control unit 130 detects a movement displacement (i.e., vector) between a current position of an object detected in a current image and a past position of the object detected in a past image, detects information on the driving of a vehicle including information on a steering angle, distance and speed of the vehicle supplied from the ECU, TCU, wheel sensor and/or steering angle sensor of the vehicle, and calculates a movement distance corresponding to the movement displacements of the two objects.

That is, the control unit 130 displays a current position of an object and a past position of the object on a current image and sets a difference value between the two objects as a movement distance between the two objects using a distance that the vehicle has moved.

Furthermore, the control unit 130 detects a predetermined reference point on the current image and a displacement up to the current object and the past object, uses triangular information formed by the reference point and the current object and the past object, that is, a movement displacement between the current object and the past object, as a reference side, uses displacements formed by the reference point and the current object and by the reference point and the past object, respectively, as two other sides, calculates angles formed by the sides, and calculates the distance from the reference point to the current object based on the calculated angles.

Furthermore, if a current object is placed on the area of a past image in the calculated area of an image, the control unit 130 can estimate a movement displacement of the object, calculate an expected position and distance up to the object placed on a specific area of an image after a lapse of a specific time based on the estimated movement displacement, the speed of a vehicle, and the relative speed of the current object detected based on the estimated movement displacement, and provide the calculated position and distance.

Furthermore, if two or more stereo cameras are used, the control unit 130 can extract the distance up to an object through a stereo vision. Here, the control unit 130 can estimate a movement displacement of the object, calculate an expected position and distance up to the object placed on a specific area of an image after a lapse of a specific time based on the estimated movement displacement, the speed of the vehicle, and the relative speed of the current object detected based on the estimated movement displacement, and provide the calculated position and distance.

Furthermore, the control unit 130 compares the calculated distance with predetermined reference distance information for determining whether or not there is a collision. If, as a result of the comparison, a collision is expected, the control unit 130 outputs a warning signal so that alarm or a warning screen is displayed.

When left and right images are received through stereo cameras installed in the head lamp of a vehicle, the taillight of the vehicle, or side-view mirrors on the left and right sides, the stereo vision program performs a pre-processing process on the stereo image input for matching brightness and epipolar lines for the left and right images, performs stereo matching for generating disparity between the pixels of areas overlapped with each other in the left and right images that are determined as the same object, removes noise components from the results of the disparity, obtains a stereo image by performing post-processing processes, such as projection, segmentation, and filtering, on information on the distance of the stereo image, and detects pieces of information, such as the distance, shape, and the direction of the object, through the stereo image.

The stereo vision program is one embodiment, and a variety of known stereo vision programs may be used.

Furthermore, the control unit 130 can output the original image, captured by a camera, as an image for display without change, but may convert the captured original image into an image having a Bird Eye View point of time using a time point conversion program and output the converted image as an image for display.

Furthermore, the control unit 130 may output the original image, captured by the camera, as an image for display or may merge several images whose points of time have been converted or stitch the several images using an image processing program and output the merged or stitched image as an image for display.

Furthermore, the control unit 130 may combine the original image captured by the camera and some of the images whose points of time have been converted or the merged images using an image processing program and output the combined image as an image for display.

The screen display unit 140 outputs an image outputted from the control unit 130 and the vehicle icon 400 in a contour or semi-transparent form having a vehicle shape together and includes output means, such as an LCD.

The vehicle icon 400 has a contour or semi-transparent form having a vehicle shape and virtually displays a current position of a vehicle in an image for display.

Furthermore, the vehicle icon 400 may display the position of the wheel (not shown) of a vehicle along with a contour or semi-transparent form having a vehicle shape. Accordingly, when a vehicle runs, an obstacle under the vehicle covered by the vehicle body of the vehicle and driving direction signs and characters for road guidance indicated in roads can be precisely delivered to a driver.

Furthermore, in a change in the position of the vehicle icon 400, only the position of the vehicle icon 400 indicated in an image for display may be changed in the state in which the image for display is fixed, only the image for display may be moved in the state in which the position of the vehicle icon 400 is fixed, or both the image for display and the position of the vehicle icon 400 may be changed.

Figure 9:
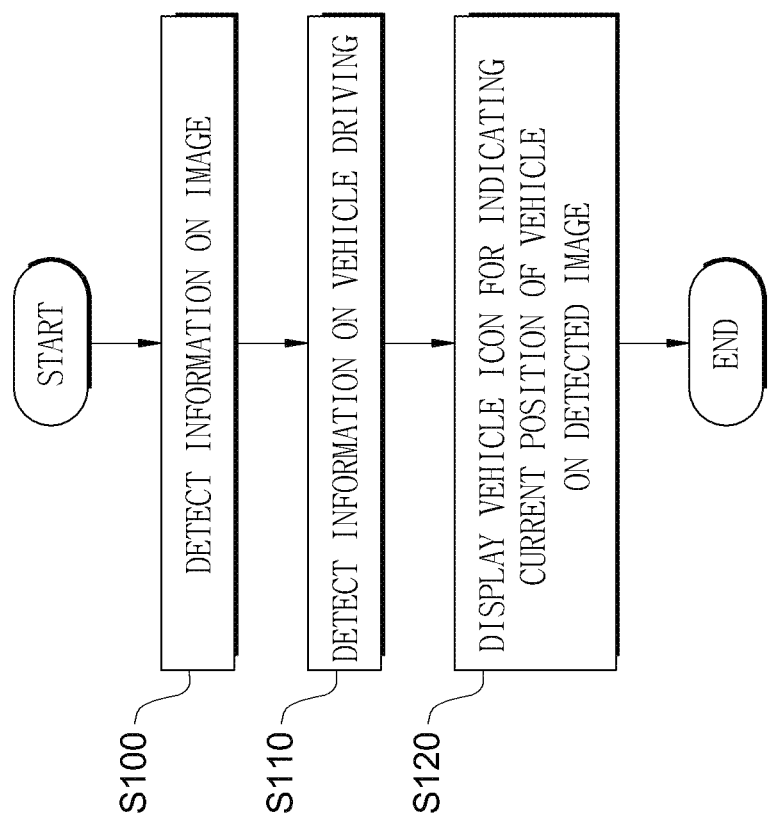
FIG. 9 is a flowchart illustrating a process of displaying a blind spot in accordance with the present invention.

FIG. 9 is a flowchart illustrating a process of displaying a blind spot in accordance with the present invention. A method for displaying a blind spot in accordance with the present invention is described with reference to FIGS. 2 and 4 to 9.

When the vehicle 200 runs forward at step S100, the second camera 120 installed in the vehicle starts photographing as the vehicle 200 runs, and the control unit 130 detects an image C or C+D for display captured by the second camera 120 at a specific point of time at step S100 and temporarily stores the detected image.

Furthermore, the control unit 130 can store and output the image for display captured at step S100 as the original image, but may convert the captured original image into an image having a Bird Eye View point of time using a time point conversion program and output the converted image as the image for display. Furthermore, the image for display captured at step S100 may be the original image captured by the camera, an image obtained by merging or stitching several images whose points of time have been converted by the control unit 130 using an image processing program, or an image obtained by combining the original image and some of the images whose points of time have been converted and the merged images by the control unit 130 using an image processing program.

After the step S100, the control unit 130 detects information on the movement displacement of the vehicle, including information on the movement distance, speed, driving direction, and steering angle of the vehicle, based on driving control information calculated by comparing a current image captured by the ECU, TCU, speed sensor, steering angle sensor, wheel sensor, and camera of the vehicle supplied from the vehicle with an image captured right before the current image and calculates a position according to the movement distance and steering direction of the vehicle per hour based on the detected movement displacement information at step S110.

The control unit 130 matches the calculated movement distance and position with the image C+D for display detected at step S100 according to a predetermined number of unit pixels and displays a virtual vehicle icon 400 indicative of a current position of the vehicle in a contour or semi-transparent form having a vehicle shape at step S120 so that the virtual vehicle icon 400 is outputted through the screen display unit 140.

The virtual vehicle icon 400 outputted through the screen display unit 140 at step S120 is displayed on the front image C+D in a contour or semi-transparent form having a vehicle shape so that obstacles (e.g., a speed bump, a boundary stone, and a median strip) within blind spots or direction guide information 500, together with information on the current position of the vehicle, can be easily recognized by a driver.

Accordingly, a safe driving environment and a safe parking environment can be provided to a driver because the driver can check blind spots covered by the vehicle body of a vehicle and thus rarely seen within a field of view of the driver and blind spots placed in the surroundings of the vehicle and not seen in a current image captured by a camera can be checked.

Meanwhile, in the present embodiment, an example in which the position of a virtual vehicle icon indicating a current position of a vehicle on a displayed image is changed and displayed on an image for display as the vehicle moves has been described. It is evident that the position of the virtual vehicle icon may be changed and displayed on an image for display in which a plurality of images is continuously arranged as the vehicle moves.

Second Embodiment

Figure 10:
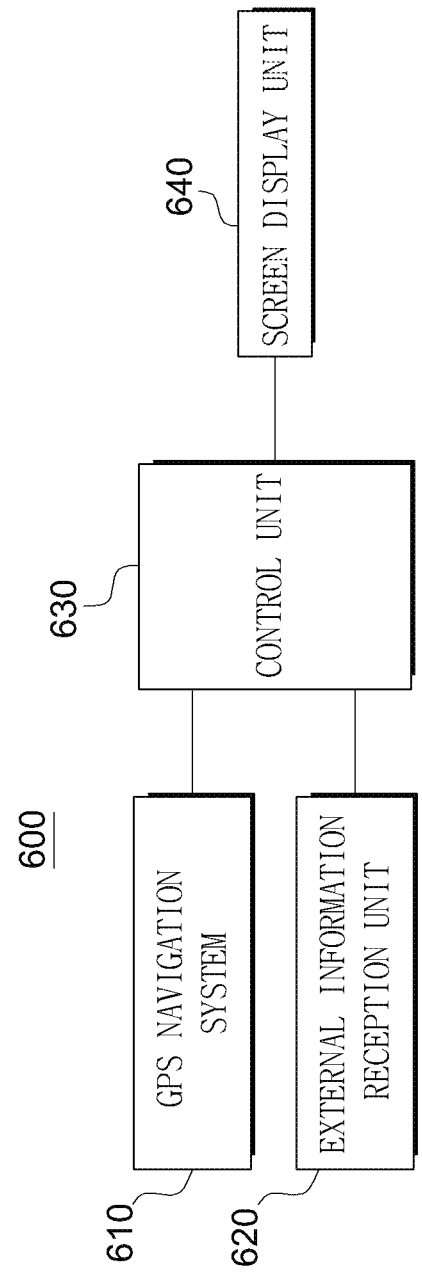
FIG. 10 is a block diagram showing another embodiment of an apparatus for displaying a blind spot in accordance with the present invention.

FIG. 10 is a block diagram showing another embodiment of an apparatus for displaying a blind spot in accordance with the present invention. The second embodiment relates to a construction for detecting images of the surroundings of a vehicle from devices other than cameras installed in the vehicle and displaying a blind spot based on the detected images.

As shown in FIG. 10, an apparatus for displaying a blind spot 600 in accordance with the second embodiment includes a GPS navigation system 610 and an external information reception unit 620 as imaging means for providing images of the surroundings of a vehicle, a control unit 630, and a screen display unit 640.

The GPS navigation system 610 is installed in the vehicle. The GPS navigation system 610 receives information on the position of the vehicle from a GPS receiver, detects information on a current position of the vehicle based on the received information, reads a map image or real image of a corresponding position previously stored in a memory (not shown) based on the detected information on the position of the vehicle, and provides the read map image or real image.

The external information reception unit 620 is connected to cameras (not shown) installed in roads and buildings in the surroundings of the vehicle over a radio network. The external information reception unit 620 receives images captured by the cameras and provides the images to the control unit 630.

A current intelligent road network system is equipped with fixed cameras for photographing some road sections or some areas of buildings, but the cameras are assigned unique IPs. Accordingly, a user can access the cameras using radio communication and easily receive and check images captured by the cameras.

That is, the external information reception unit 620 accesses, for example, IP cameras installed in roads or buildings in the surroundings of roads through radio communication, receives images provided by the IP cameras and information on positions where the IP cameras are installed, stores the received images and information in the memory (not shown), and provides the images received from the IP cameras to the control unit 630. Furthermore, the external information reception unit 620 detects a current position of the vehicle from the GPS navigation system 610 or a GPS receiver (not shown) along with information on positions where the IP cameras are installed supplied from the IP cameras and sends the detected current position and the information on the positions to the control unit 630.

The control unit 630 detects a map image of a corresponding position or an image of a position where the vehicle is placed, which are supplied by the GPS navigation system 610 or the external information reception unit 620 at a specific point of time and generates an image for display using the detected one or more images without change or displays and outputs an image for display that has been reconfigured by merging the detected one or more images with an image captured at a specific point of time or images captured right before the specific point of time using an image processing program, converting points of time of the detected images using a time point conversion program, or combining some of the detected images.

That is, the control unit 630 can output the original image captured by, for example, the IP camera as an image for display without change, but may convert the captured original image into an image having a Bird Eye View point of time using a time point conversion program and output the converted image as an image for display.

Furthermore, the control unit 630 may output the original image captured by the IP camera as an image for display or may merge or stitch past several images whose points of time have been converted using an image processing program and output the merged or stitched image as an image for display. The control unit 630 may combine the original image captured by the IP camera and some of the images whose points of time have been converted or the merged images using an image processing program and output the combined image as an image for display.

Furthermore, the control unit 630 compares driving control information, detected by the ECU, TCU, speed sensor, steering angle sensor, and wheel sensor of the vehicle, with driving control information received prior to a specific point of time and detects information on the movement displacement of the vehicle, such as the movement distance, speed, driving direction, and steering angle of the vehicle, based on a result of the comparison.

Furthermore, when the GPS navigation system 610 detects information on the position of the vehicle, supplied outside the vehicle, through a GPS receiver and outputs the detected information, the control unit 630 can compare a map image corresponding to the position information with information on the position of the vehicle and an image received prior to a specific point of time and detect information on a movement displacement of the vehicle based on a result of the comparison.

Furthermore, the control unit 630 can compare information on the position of a camera detected by the street-view receiver 620 and information on a movement distance using surrounding images and the GPS navigation system 610 and detect information on a movement displacement of the vehicle based on a result of the comparison.

Furthermore, the control unit 630 detects information on a current position of the vehicle that has moved from a specific position based on the detected information on the movement displacement of the vehicle and displays a contour or semi-transparent vehicle icon indicative of the detected current position of the vehicle on the generated image for display.

The screen display unit 640 outputs the virtual vehicle icon having a contour or semi-transparent vehicle form along with the image outputted from the control unit 630. The screen display unit 640 includes output means, such as an LCD.

As described above, the preferred embodiments of the present invention have been described, but those skilled in the art will understand that the present invention can be modified and changed in various ways without departing from the spirit and scope of the present invention described in the claims.

INDUSTRIAL APPLICABILITY

Accordingly, the disposition of obstacles placed in blind spots that are covered by the vehicle body of a vehicle and thus rarely seen within a field of view of a driver in a current position can be easily checked using images of the surroundings of the vehicle. Accordingly, a safe driving environment and a safe parking environment can be provided to a driver.

The invention claimed is:

1. An apparatus for displaying a blind spot, comprising:
   an imaging unit for detecting surrounding images of a vehicle;
   a control unit for merging each of at least one image captured by the imaging unit at a specific point of time and before the specific point of time, side by side in chronological order, and outputting the image obtained by merging as an image for display and displaying a vehicle icon indicative of a current position of the vehicle on the outputted image for display in a contour form or semi-transparently so that a blind spot proximate the vehicle and a blind spot covered by the vehicle body are displayed; and
   a screen display unit for displaying the image for display and the vehicle icon outputted from the control unit,
   wherein the outputted image for display is any one of an original image of the captured image, an image obtained by converting the point of time of the original image and an image obtained by merging the original image and a plurality of images comprising converted points of time.

2. The apparatus according to claim 1, wherein the outputted image for display comprises a combination of images among the plurality of images.

3. The apparatus according to claim 1, wherein the blind spot covered by the vehicle body comprises a lower part of the vehicle.

4. The apparatus according to claim 3, wherein the imaging unit is any one of a camera installed in the vehicle and configured to capture the surrounding images of the vehicle and provide the captured images, a GPS navigation system configured to detect information on a position of the vehicle and provide a surrounding image corresponding to the detected information, and an external information reception unit configured to receive the surrounding images of the vehicle from cameras installed in surrounding roads or buildings of the vehicle and provide the received surrounding images.

5. The apparatus according to claim 4, wherein, in response to information on a position movement of the vehicle being supplies outside the vehicle or driving control information being detected from the vehicle, the control unit calculates displacement information on a movement of the vehicle from a specific position, using information on a position movement of the vehicle supplied outside the vehicle or driving control information detected from the vehicle, and detects information on the current position of the vehicle based on the calculated displacement information, using the information on a position movement of the vehicle supplied outside the vehicle or the driving control information detected from the vehicle.

6. The apparatus according to claim 4, wherein the control unit is operable with a display to display a position of the vehicle icon displayed on the image for display by incorporating information on a real-time position according to a movement of the vehicle into the position of the vehicle icon.

7. The apparatus according to claim 6, wherein, in response to movement of the vehicle, a change of the position of the vehicle icon displayed on the image for display comprises displaying the changed position of the vehicle icon by moving only the vehicle icon on the image for display, displaying the changed position of the vehicle icon by fixing the position of the vehicle icon on a predetermined position and moving only the image for display, or displaying by moving both the image for display and the position of the vehicle icon.

8. The apparatus according to claim 3, wherein the generated image for display is obtained by merging image areas moved by a predetermined number of unit pixels using information on a position of the vehicle supplied from the vehicle or driving control information detected from the vehicle.

9. The apparatus according to claim 3, wherein the generated image for display is obtained by comparing images with each other and extracting and merging an image area including pixels having high similarity and an image area including pixels having low similarity proximate the image area including the pixels having high similarity as a result of the comparison.

10. The apparatus according to claim 3, wherein information on the generated image is obtained by extracting a reduced image search area according to information on a speed and steering angle of the vehicle based on information on a driving of the vehicle comprising the speed and movement direction of the vehicle supplied from the vehicle, and extracting and merging an image area including pixels having high similarity from the reduced image search area.

11. A method for displaying a blind spot, comprising:
merging, by a control unit, each of at least one image, respectively captured by an imaging unit at a specific point of time and prior to the specific point of time, side by side in a chronological order, and outputting the image obtained by merging as an image for display; and
calculating, by the control unit, information on a displacement of a vehicle moved from a specific position based on information on a movement of a position of the vehicle supplied outside the vehicle or driving control information supplied from the vehicle and detecting a current position of the vehicle based on the calculated information on the movement displacement,
the control unit being operable with a display for displaying the image for display and a vehicle icon indicative of the current position of the vehicle by displaying the vehicle icon, based on the current position and the displacement information, on the image for display in a contour form or semi-transparently so that a blind spot proximate the vehicle and a blind spot covered by a vehicle body are displayed, and
wherein the outputted image for display is any one of an original image of the captured image, an image obtained by converting the point of time of the original image, and image obtained by merging the original image and a plurality of images comprising converted points of time.

12. The method according to claim 11, wherein the image for display comprises a combination of images among the plurality of images.

13. The method according to claim 11, wherein the image for display is an image captured by any one of a camera installed in the vehicle and configured to capture the surrounding images of the vehicle and provide the captured images, a GPS navigation system configured to detect information on a position of the vehicle and provide a surrounding image corresponding to the detected information, and an external information reception unit configured to receive the surrounding images of the vehicle from cameras installed in surrounding roads or buildings of the vehicle and provide the received surrounding images.

14. The method according to claim 13, wherein the vehicle icon is displayed so that a position of the vehicle icon displayed on the image for display is changed by incorporating information on a real-time position according to a movement of the vehicle into the position of the vehicle icon.

15. The method according to claim 14, wherein, in response to movement of the vehicle, a change of the position of the vehicle icon displayed on the image for display comprises displaying the changed position of the vehicle icon by moving only the vehicle icon on the image for display, displaying the changed position of the vehicle icon by fixing the position of the vehicle icon on a predetermined position and moving only the image for display, or displaying by moving both the image for display and the position of the vehicle icon.

16. The apparatus according to claim 2, wherein the blind spot covered by the vehicle body comprises a lower part of the vehicle.

* * * * *